US010808783B2

(12) United States Patent
Takahashi et al.

(10) Patent No.: US 10,808,783 B2
(45) Date of Patent: Oct. 20, 2020

(54) DRIVE DEVICE AND PUMP DEVICE

(71) Applicant: MIKUNI CORPORATION, Tokyo (JP)

(72) Inventors: Jun Takahashi, Iwate (JP); Fumitaka Yokosawa, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 217 days.

(21) Appl. No.: 16/099,694

(22) PCT Filed: Apr. 24, 2017

(86) PCT No.: PCT/JP2017/016241
§ 371 (c)(1),
(2) Date: Nov. 8, 2018

(87) PCT Pub. No.: WO2017/195584
PCT Pub. Date: Nov. 16, 2017

(65) Prior Publication Data
US 2019/0186571 A1 Jun. 20, 2019

(30) Foreign Application Priority Data

May 12, 2016 (JP) .................................. 2016-096334

(51) Int. Cl.
*H02K 11/00* (2016.01)
*F16F 1/04* (2006.01)
(Continued)

(52) U.S. Cl.
CPC .............. *F16F 1/047* (2013.01); *F04C 15/00* (2013.01); *F04C 15/008* (2013.01); *F16F 1/12* (2013.01);
(Continued)

(58) Field of Classification Search
CPC .......... F16F 1/047; H02K 11/40; H02K 11/33
See application file for complete search history.

(56) References Cited

U.S. PATENT DOCUMENTS 6,081,056 A * 6/2000 Takagi ..................... H02K 5/08
310/216.137
9,926,929 B2 * 3/2018 Takahashi ............. F04C 15/008
(Continued)

FOREIGN PATENT DOCUMENTS

DE     102009053472     6/2011
JP       2002136056     5/2002
(Continued)

OTHER PUBLICATIONS

"International Search Report (Form PCT/ISA/210)" of PCT/JP2017/016241, dated Jul. 18, 2017, with English translation thereof, pp. 1-2.
(Continued)

*Primary Examiner* — Alexander Talpalatski
(74) *Attorney, Agent, or Firm* — JCIPRNET

(57) ABSTRACT

A pump device (10) includes: a drive unit (30); a cover body (150); a circuit board (130) which faces the cover body (150) and the drive unit (30) in an electrically non-contact state therewith; and a spring member (160) disposed across front and rear sides of the circuit board (130) and in contact with the cover body (150) and the drive unit (30) in an electrically conductive state. The drive unit (30), the spring member (160) and the cover body (150) constitute a static elimination path. The spring member (160) comprises: a spring deformation part (163) which enables spring deformation such that neighboring wires (161) can move toward or away from each other; and an electrically conductive bypass path (162) which is continuously disposed with at least one end of the spring deformation part (163) and is positioned across the front and rear sides of the circuit board (130).

4 Claims, 9 Drawing Sheets

(51) Int. Cl.
   *H02K 11/33*   (2016.01)
   *H02K 11/40*   (2016.01)
   *F04C 15/00*   (2006.01)
   *F16F 1/12*    (2006.01)

(52) U.S. Cl.
   CPC .............. *H02K 11/33* (2016.01); *H02K 11/40* (2016.01); *F16F 2230/22* (2013.01)

(56) References Cited

U.S. PATENT DOCUMENTS

| | | | | |
|---|---|---|---|---|
| 2010/0066182 | A1* | 3/2010 | Yamazaki | H02K 33/16 310/29 |
| 2016/0218596 | A1* | 7/2016 | Hayashi | B62D 5/04 |
| 2017/0335914 | A1* | 11/2017 | Thomas | A47C 27/065 |

FOREIGN PATENT DOCUMENTS

| | | |
|---|---|---|
| JP | 2014136975 | 7/2014 |
| JP | 2015115140 | 6/2015 |

OTHER PUBLICATIONS

Office Action of Deutsches Counterpart Application, with English translation thereof, dated Feb. 28, 2020, pp. 1-10.

\* cited by examiner

DRIVE DEVICE AND PUMP DEVICE

CROSS-REFERENCE TO RELATED APPLICATION

This application is a 371 application of the international PCT application Ser. No. PCT/JP2017/016241, filed on Apr. 24, 2017, which claims the priority benefit of Japan application no. 2016-096334, filed on May 12, 2016. The entirety of each of the above-mentioned patent applications is hereby incorporated by reference herein and made a part of this specification.

BACKGROUND

Technical Field

The disclosure relates to a drive device and a pump device.

Background Art

In a vehicle such as an automobile, a pump device using an oil has been used to cool a drive part such as an engine or a motor (a driving motor or a power generation motor). The applicant of the disclosure filed a patent application for such a pump device in Japanese Patent Application No. 2015-115140 (hereinafter referred to as Relevant Application 1). In FIG. 1 or the like of Relevant Application 1 of the applicant, a coil spring is illustrated, the coil spring is interposed between a screw and a cover body, and the coil spring, the screw, and the cover body constitute a static electricity removing path extending to an external connection terminal which is grounded.

Patent Literature 1 also discloses the above-mentioned static electricity removing path. Patent Literature 1 disclose a configuration in which a spring bearing having a protrusion shape protrudes from a cover body and a coil spring is supported by the spring bearing.

CITATION LIST

Patent Literature

[Patent Literature 1]
Japanese Patent Laid-Open Publication No. 2014-136975

SUMMARY

Technical Problem

In the configuration disclosed in Relevant Application 1, the coil spring extends over the front side and the back side of a circuit board. In this case, when a current flows in the coil spring, magnetic field lines penetrating the circuit board are formed and a conductive portion on the circuit board may be adversely affected due to electromagnetic induction based on the magnetic field lines.

Here, in order to reduce the magnetic field lines penetrating the circuit board, as described in Patent Literature 1, it is conceivable that a spring bearing having a protrusion shape be provided in a cover body. However, when a spring bearing having a protrusion shape is provided, for example, a shape of a die becomes complicated as according to formation of the part having the protrusion shape and costs increase correspondingly. There is also a problem in that attachment places thereof are restricted, or the like. Accordingly, it is preferable that a portion such as a spring bearing having a protrusion shape that supports the coil spring not be provided.

The disclosure has been made in consideration of the above-mentioned circumstances and an objective thereof is to provide a drive device and a pump device that has a simple configuration in which a spring bearing having a protrusion shape is not provided and can reduce an influence of a magnetic field from a coil spring on a circuit board.

Solution to Problem

In order to achieve the above-mentioned objective, according to a first aspect of the disclosure, there is provided a drive device including: a drive unit that generates a driving force and at least a part of which is formed of a conductive member; a cover body at least a part of which is formed of a conductive member; a circuit board that controls driving of the drive unit is disposed between the cover body and the drive unit, and faces the cover body and the drive unit in an electrical noncontact state; and a spring member that is disposed over front and back sides of the circuit board on a circumferential edge portion of the circuit board or is disposed over the front and back sides of the circuit board by penetrating through a penetration hole in the circuit board, and comes in contact with the cover body and the drive unit in an electrically connectable state, wherein the drive unit, the spring member, and the cover body constitute a static electricity removing path that discharges static electricity to the outside, and the spring member includes a spring deformation portion that enables spring deformation such that neighboring wires of the spring member move toward or away from each other by winding the neighboring wires in a noncontact state and a conductive bypass portion that is formed continuously from at least one end of the spring deformation portion and extends over the front and back sides of the circuit board.

According to another aspect of the disclosure, in the above-mentioned disclosure, it is preferable that the conductive bypass portion include a closely-positioned winding portion in which neighboring wires are brought into close contact with each other and a current flows between the neighboring wires in the closely-positioned winding portion in a short-circuiting manner.

According to another aspect of the disclosure, in the above-mentioned disclosure, it is preferable that the closely-positioned winding portion be disposed at both ends of the spring deformation portion.

According to a second aspect of the disclosure, there is provided a pump device including: a drive unit that generates a driving force and at least a part of which is formed of a conductive member; a cover body at least a part of which is formed of a conductive member; a circuit board that controls driving of the drive unit is disposed between the cover body and the drive unit, and faces the cover body and the drive unit in an electrical noncontact state; and a spring member that is disposed over front and back sides of the circuit board on a circumferential edge portion of the circuit board or is disposed over the front and back sides of the circuit board by penetrating through a penetration hole in the circuit board, and comes in contact with the cover body and the drive unit in an electrically connectable state, wherein the drive unit, the spring member, and the cover body constitute a static electricity removing path that discharges static electricity to the outside, the spring member includes a spring deformation portion that enables spring deformation such that neighboring wires of the spring member move toward or away from each other by winding the neighboring wires in a noncontact state and a conductive bypass portion that is formed continuously from at least one end of the spring deformation portion and extends over the front and back sides of the circuit board, the drive unit is a motor unit that applies a driving force for rotating a rotation shaft, a pump unit is attached to the motor unit, and the pump unit includes a rotor portion that is rotatable and is rotated by the rotation shaft.

Advantageous Effects

With the drive device and the pump device according to the disclosure, it is possible to provide a simple configuration in which a spring bearing having a protrusion shape is not provided and to reduce an influence of a magnetic field from a coil spring on a circuit board.

DESCRIPTION OF EMBODIMENTS

Hereinafter, a pump device 10 including a drive device according to an embodiment of the disclosure will be described with reference to the accompanying drawings. In the following description, an axial direction of a rotation shaft 31 is defined as an X direction, a cover body 150 side of the rotation shaft 31 is defined as an X1 side, and a pump cover 24 side thereof is defined as an X2 side.

1. Configuration of Pump Device 10

Figure 1:
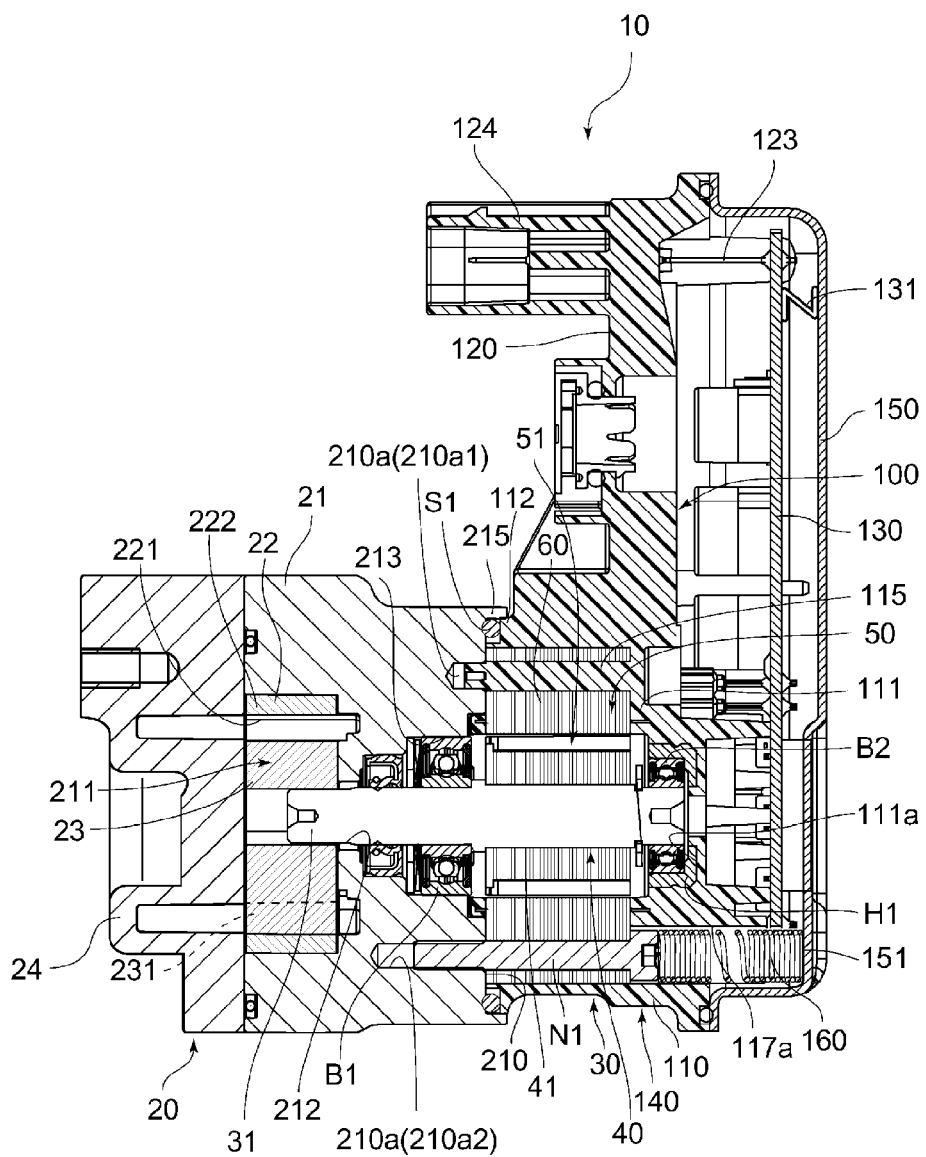
FIG. 1 is a lateral sectional view illustrating a configuration of a pump device according to an embodiment of the disclosure.
Figure 2:
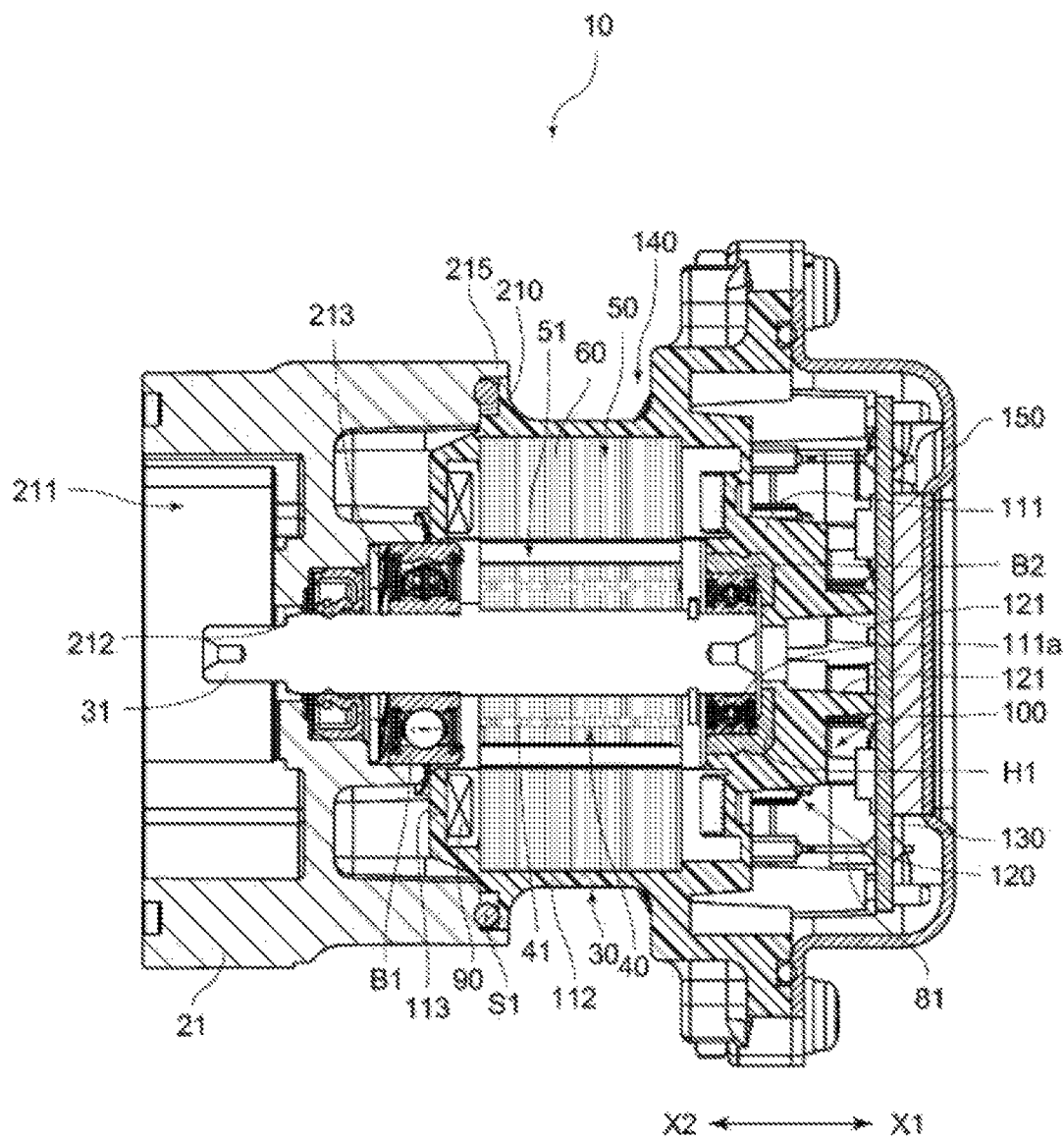
FIG. 2 is a sectional view illustrating the configuration of the pump device and illustrating a sectional shape at a position deviated by 90 degrees in the circumferential direction from FIG. 1 in a pump unit and an electric motor unit.

FIG. 1 is a sectional view illustrating a configuration of a pump device 10. FIG. 2 is a sectional view illustrating the configuration of the pump device 10 and illustrates a sectional shape at a position which is deviated 90 degrees in the circumferential direction with respect to FIG. 1 in a pump unit 20 and a motor unit 30. In FIG. 2, an outer rotor 22, an inner rotor 23, and a pump cover 24 are not illustrated.

As illustrated in FIGS. 1 and 2, the pump device 10 includes a pump unit 20, a motor unit 30, a resin-molded portion 100, a circuit board 130, a cover body 150, and a spring member 160 as principal elements, which are unified by fastening means such as a tightening bolt N1 or other screws. The elements will be described below.

In this embodiment, the pump unit 20 is a trochoid pump (an inscribed gear pump). As illustrated in FIG. 1, the pump unit 20 includes a pump body 21, and the pump body 21 includes a recessed portion 211 in which an outer rotor 22 and an inner rotor 23 are disposed. The recessed portion 211 is recessed by a depth with which the outer rotor 22 and the inner rotor 23 can be accommodated from an X2-side end face of the pump body 21 to the X1 side, and a planar shape thereof has a size corresponding to the outer rotor 22.

A pump cover 24 is attached to the X2 side of the pump body 21, and the recessed portion 211 is accordingly covered with the pump cover 24.

The outer rotor 22 is rotatably disposed in the recessed portion 211. The rotation center of the outer rotor 22 is eccentric from the rotation center of the inner rotor 23 and the rotation shaft 31. As widely known, the outer rotor 22 includes an inner circumferential recessed portion 221 on the inner circumference side thereof, and an inner wall surface of the inner circumferential recessed portion 221 is formed as an internal gear 222. The inner rotor 23 is disposed in the inner circumferential recessed portion 221, and an external gear 231 which comes into contact with and separates from the internal gear 222 is provided on an outer circumferential wall surface of the inner rotor 23. The internal gear 222 and the external gear 231 are formed by a trochoid curve.

At the rotation center of the inner rotor 23, a hole portion into which the rotation shaft 31 is inserted is provided to engage with the rotation shaft 31. The pump device 10 is not limited to the above-mentioned trochoid pump, and various pumps such as a circumscribed gear pump, a vane pump, a volute pump, a cascade pump, and a piston pump can be used.

As illustrated in FIG. 1, a penetration hole 212 is provided in the pump body 21, and the rotation shaft 31 is inserted into the penetration hole 212. The rotation shaft 31 is rotatably supported by the pump body 21 with a bearing B1 interposed therebetween. The bearing B1 is fitted into a fitting portion 213 which is recessed from a contact face 210 coming into contact with a stator core 60 to the other side (the X2 side). One end (the X1-side end) of the rotation shaft 31 is rotatably supported by a bearing B2 fitted into a holder H1 which is located in a recessed fitting portion 111a which will be described later.

As illustrated in FIG. 1, an outer circumferential flange portion 215 is provided in an outer circumferential edge portion of the contact face 210 to protrude to the X1 side and a seal member S1 such as an O ring is disposed on the inner circumference of the outer circumferential flange portion 215. When the seal member S comes into contact with a portion of an outer circumferential molded portion 112 on the X2 side of a stator molded portion 110, the inside of the motor unit 30 is sealed from the outside.

As illustrated in FIG. 1, a plurality of hole portions 210a are provided to extend from the contact face 210 to the X2 side. The above-mentioned tightening bolt N1 is screwed into or a positioning pin 115 which will be described later is inserted into the hole portions 210a. Accordingly, the hole portions 210a include hole portions in which a thread is formed and hole portions in which a thread is not formed. In this embodiment, among a total of six hole portions 210a arranged at intervals of 60 degrees, a thread is formed in three hole portions 210a arranged at intervals of 120 degrees and a thread is not formed in the other three hole portions 210a. In the following description, the hole portions 210a in which a thread is not formed are referred to as hole portions 210a1, and the hole portions 210a in which a thread is formed are referred to as hole portions 210a2. The hole portions 210a are configured not to penetrate the pump body 21.

The tightening bolt N1 is formed of a metal which is a conductive member. The tightening bolt N1 constitutes a static electricity removing path for static electricity as will be described later.

Here, the pump body 21 and the pump cover 24 are formed of, for example, an aluminum alloy having conductivity using a die cast method, but may be formed of any material as long as it is a conductive member having conductivity. Similarly to the pump body 21 and the pump cover 24, it is preferable that the outer rotor 22 and the inner rotor 23 be formed of a conductive member. Practically, for example, the material is preferably a metal such as an aluminum alloy (an Al—Si type, an Al—Si—Cu type, an Al—Fe—Cu type, an Al—Si—Mg type, an Al—Si—Fe—Cu type, or an Al—SiC composite material in which SiC powder is added to an aluminum alloy) or an iron-based material (such as stainless steel or cast iron).

The motor unit 30 will be described below. The motor unit 30 corresponds to the drive unit. The drive device according to this embodiment includes at least the motor unit 30, the circuit board 130, the cover body 150, and the spring member 160 and may further include, for example, the resin-molded portion 100 and other members.

Figure 3:
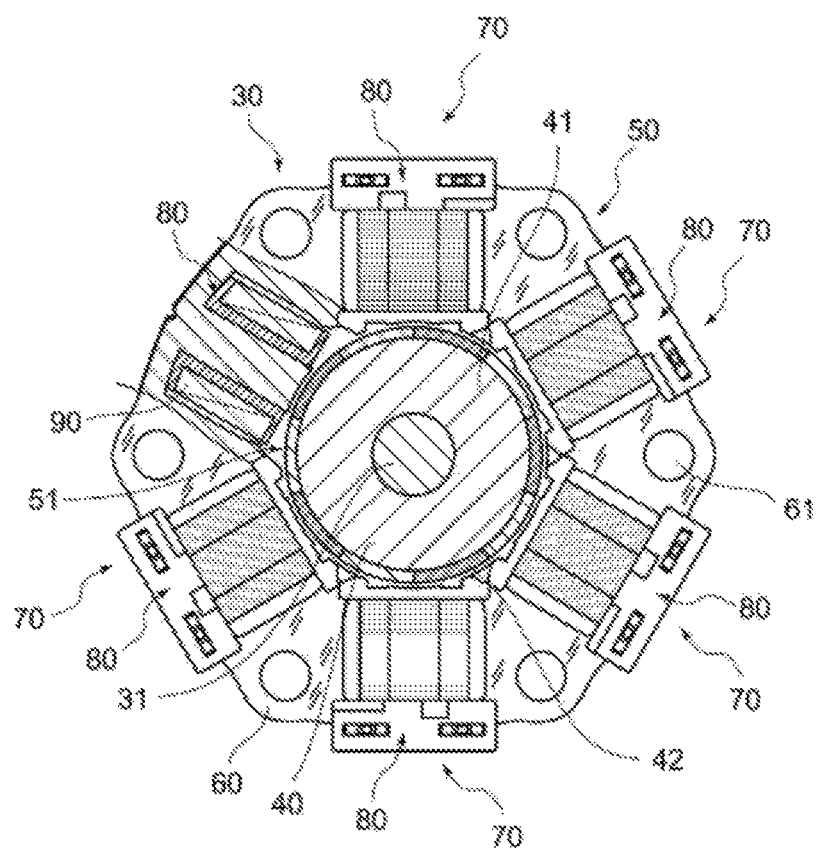
FIG. 3 is a plan view illustrating a configuration of a motor unit of the pump device and illustrating a partial section.

FIG. 3 is a plan view illustrating the configuration of the motor unit 30 and also illustrates a partial section. As illustrated in FIGS. 1 and 3, the motor unit 30 includes the rotation shaft 31 shared by the pump unit 20, and a rotor 40 is provided on the outer circumference of the rotation shaft 31. The rotor 40 includes a yoke 41 and a magnet 42. The yoke 41 is attached to the outer circumference side of the rotation shaft 31 and, for example, an electromagnetic steel sheet such as a silicon steel sheet having an electrically insulating film on the surface thereof is pressed and then stacked thereon by molding. Here, the yoke 41 may be formed of any magnetic material such as ferrite or a magnetic powder core. A configuration in which the yoke 41 is not used may be employed.

The magnet 42 is attached to the outer circumference side of the yoke 41. The magnet 42 is attached to the outer circumference side of the yoke 41 in a state in which the magnetic pole changes at predetermined angles. The rotor 40 of the motor unit 30 is constituted by the yoke 41 and the magnets 42. However, the concept of the rotor 40 may include another member (for example, the rotation shaft 31) that rotates along with the yoke 41 or the magnets 42 and that is formed integrally with or separately from the yoke 41 or the magnets 42.

As will be described later, when six coils are present in a stator 50, the same numbers of S poles and N poles are provided on the outer circumference side of the rotor 40.

As illustrated in FIG. 3, the stator 50 is disposed on the outer circumference side of the rotor 40 such that they face each other. That is, the rotor 40 is located at a center hole 51 of the stator 50. The stator 50 includes a stator core 60 and a coil-wound body 70. The stator core 60 is formed, for example, by stacking a plurality of electromagnetic steel sheets 600 such as silicon steel sheets having an electrically insulating film on the surface thereof and then press-molding the resultant. However, the stator core 60 may be formed of a magnetic material other than the electromagnetic steel sheet 600, such as ferrite or a magnetic powder core.

The coil-wound body 70 is attached to the stator core 60. The coil-wound body 70 includes a bobbin 80 and a coil 90. The coil 90 is formed by winding a wire around the bobbin 80. A connection terminal 81 which is formed of a conductive member (such as a metal) is integrally attached to the bobbin 80 (see FIG. 2) and the connection terminal 81 penetrates an attachment hole (not illustrated) of the circuit board 130.

The resin-molded portion 100 is integrally attached to the stator core 60. The resin-molded portion 100 is a portion which is formed integrally with the stator core 60 by installing a holder H1 or the like for supporting the bearing B2 in a die, additionally installing the stator core 60 having the coil-wound body 70 attached thereto, and then injecting a resin thereinto.

Figure 4:
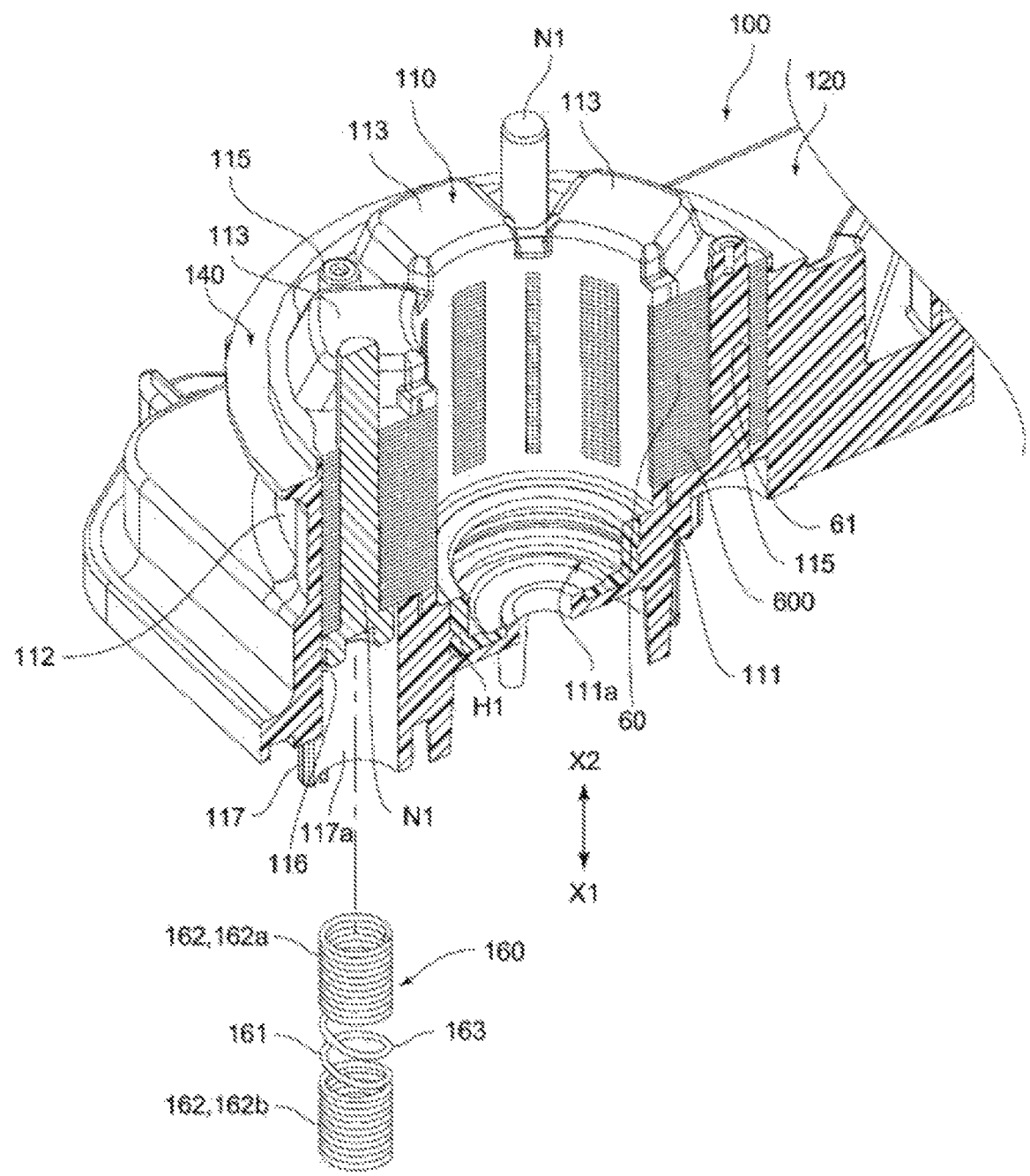
FIG. 4 is a perspective view illustrating a half section of a resin-molded portion which is unified with a stator core.

FIG. 4 is a perspective view illustrating a half section of the resin-molded portion 100 which is formed integrally with the stator core 60. In FIG. 4, for the purpose of allowing easy understanding of the configuration, some components are not illustrated. As illustrated in FIG. 4, the resin-molded portion 100 includes a stator molded portion 110 and a board attaching portion 120. The stator molded portion 110 is a portion having a substantially cylindrical appearance and is configured by covering the stator core 60 with a resin. The stator molded portion 110 constitutes the motor unit 30. The board attaching portion 120 is a portion having a rectangular box-shaped appearance and is continuous with the stator molded portion 110 having a substantially cylindrical shape.

As illustrated in FIG. 2, a plurality of bosses 121 are formed to protrude from the board attaching portion 120 having a rectangular box shape. In each boss 121, the circuit board 130 can be received by the protruding tip thereof. One of the plurality of bosses 121 is provided with a screw hole which is not illustrated. Accordingly, by inserting a screw into a penetration hole of the circuit board 130 and fastening the screw into the boss 121, the circuit board 130 is attached to the board attaching portion 120.

The cover body 150 is also attached to the board attaching portion 120, and thus the circuit board 130 or the like is sealed from the outside. In the following description, a structure in which the stator core 60 or the like is formed integrally with the resin-molded portion 100 is referred to as a stator module 140 if necessary.

In the above-mentioned stator molded portion 110, a bottom-side molded portion 111 is provided on the X1 side and the X1-side end of the stator core 60 is supported by the bottom-side molded portion 111. A recessed fitting portion 111a which is recessed to the X1 side is provided on the center side in the radial direction of the bottom-side molded portion 111, a concave holder H1 is attached to the recessed fitting portion 111a, and the bearing B2 is fitted into the holder H1. The X1-side end of the rotation shaft 31 is supported by the bearing B2.

An outer circumferential molded portion 112 is provided on the outer circumference side of the stator core 60 in the stator molded portion 110, and the outer circumference side of the stator core 60 is covered with the outer circumferential molded portion 112.

As described above, the coil-wound body 70 is attached to the stator core 60, and an insulating cover portion 113 is provided to cover the X2 side of the coil-wound body 70. As illustrated in FIG. 4, the insulating cover portion 113 protrudes to the X2 side from the X2-side end of the stator core 60. The insulating cover portion 113 does not cover the entire X2 side of the stator core 60, and a part thereof is exposed.

As illustrated in FIGS. 1 and 4, a positioning pin 115 protrudes from diameter radial outer side of the bottom-side molded portion 111 with respect to the recessed fitting portion 111a. The positioning pin 115 extends from a penetration hole 61 of the stator core 60 and further protrudes to the X2 side from the stator core 60. That is, by causing a resin to flow into the penetration hole 61 at the time of injection molding, the positioning pin 115 extending to the X2 side from the stator core 60 is formed.

The tip of the positioning pin 115 is inserted into the hole portion 210a1 of the pump body 21. Accordingly, the position in the circumferential direction of the pump body 21 is determined with respect to the stator molded portion 110. It is preferable that there be at least two positioning pins 115.

As illustrated in FIG. 4, a plurality of (for example, three) insertion holes 116 are provided in the circumferential direction of the stator molded portion 110. Each insertion hole 116 is formed to penetrate the bottom-side molded portion 111. The insertion holes 116 are provided to communicate with all the penetration holes 61 penetrating the electromagnetic steel sheet 600. Accordingly, by inserting the tightening bolt N1 into the insertion hole 116 and additionally inserting the bolt into the penetration hole 61, and screwing the bolt into the hole portion 210a2, the stator core 60 is fixed to the pump body 21 side.

Here, a guide wall portion 117 facing the X1 side in the axial direction (the X direction) is formed in at least one of the insertion holes 116. The guide wall portion 117 is a tubular portion having a tubular hole 117a communicating with the insertion hole 116, and a part of the tubular shape may be cut out. The coil spring 160 is disposed in the tubular hole 117a as will be described later.

A connector terminal 123 illustrated in FIG. 1 is attached to the board attaching portion 120, and the connector terminal 123 is inserted into a terminal hole (not illustrated) of the circuit board 130. The connector terminal 123 is electrically connected to a pattern circuit of the circuit board 130. The X2 side of the connector terminal 123 is exposed in a connector cover 124 (see FIG. 1) and is electrically connected to an external connection terminal (not illustrated).

One of a plurality of connector terminals 123 is grounded via the external connection terminal. Accordingly, the one connector terminal 123 constitutes the static electricity removing path for static electricity. However, the plurality of connector terminals 123 may be grounded via the external connection terminal.

A pin hole (not illustrated) into which a connection terminal 81 is inserted (see FIG. 2) is provided in the circuit board 130. A conductive portion is provided around the pin hole. Accordingly, by inserting the connection terminal 81 into the pin hole and performing soldering thereon or attaching a separate member thereto if necessary, a circuit pattern of the circuit board 130 is electrically connected to the connection terminal 81.

A conductive elastic member 131 constituting the static electricity removing path for static electricity is attached to the circuit board 130. The conductive elastic member 131 is a member which comes in contact with the cover body 150 which will be described later such that it applies a biasing force thereto with a predetermined amount of compression and is formed of a conductive member having conductivity (for example, a metal member). The conductive elastic member 131 is formed by bending a metal member. In the configuration illustrated in FIG. 1, the conductive elastic member 131 is provided to have a Z shape when seen in a lateral direction. However, the conductive elastic member 131 may have any shape as long as it comes into contact with the cover body 150 while applying a biasing force thereto with a predetermined amount of compression.

The conductive elastic member 131 is electrically connected to at least one connector terminal 123 of a plurality of connector terminals 123, and the connector terminal 123 is grounded via the external connection terminal. The connector terminal 123 grounded via the external connection terminal is electrically connected to the conductive elastic member 131 via a conductive pattern on the circuit board 130.

As illustrated in FIGS. 1 and 2, the cover body 150 is attached to the board attaching portion 120. The cover body 150 has a function of protecting the circuit board 130 by causing the circuit board 130 to be located between the board attaching portion 120 and the cover body. The cover body 150 constitutes the static electricity removing path of static electricity. Accordingly, the cover body 150 is formed of a conductive member having conductivity (for example, a metal member).

The cover body 150 is formed, for example, by press-molding a metal sheet. Accordingly, it is difficult to form a protrusion-shaped spring bearing as described in Patent Literature 1. As illustrated in FIG. 1, the coil spring 160 comes in contact with a predetermined portion of a bottom wall surface 151 inside the cover body 150, and the coil spring 160 is disposed in the tubular hole 117a.

2. Coil Spring

The coil spring 160 will be described below. As illustrated in FIG. 1, the coil spring 160 is disposed in the tubular hole 117a. The coil spring 160 is a compression spring constituting the static electricity removing path and is formed, for example, by winding a wire 161 formed of a metal such as a piano wire, a hard steel wire, or a stainless steel wire. The surface of the wire 161 is not covered with an insulating coating and has electrical conductivity.

The X2 side of the coil spring 160 comes in contact with the tightening bolt N1 and the X1 side thereof comes in contact with the bottom wall surface 151 of the cover body 150. Accordingly, when the pump body 21 is charged, a current can be caused to flow to the external connection terminal grounded to the outside via the tightening bolt N1, the coil spring 160, the cover body 150, the conductive elastic member 131, and the connector terminal 123.

Figure 5:
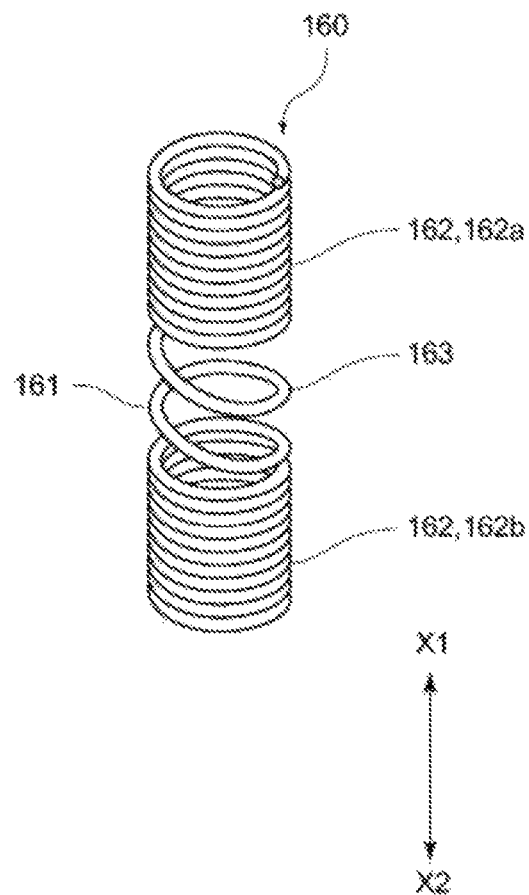
FIG. 5 is a perspective view illustrating a configuration of a coil spring.
Figure 6:
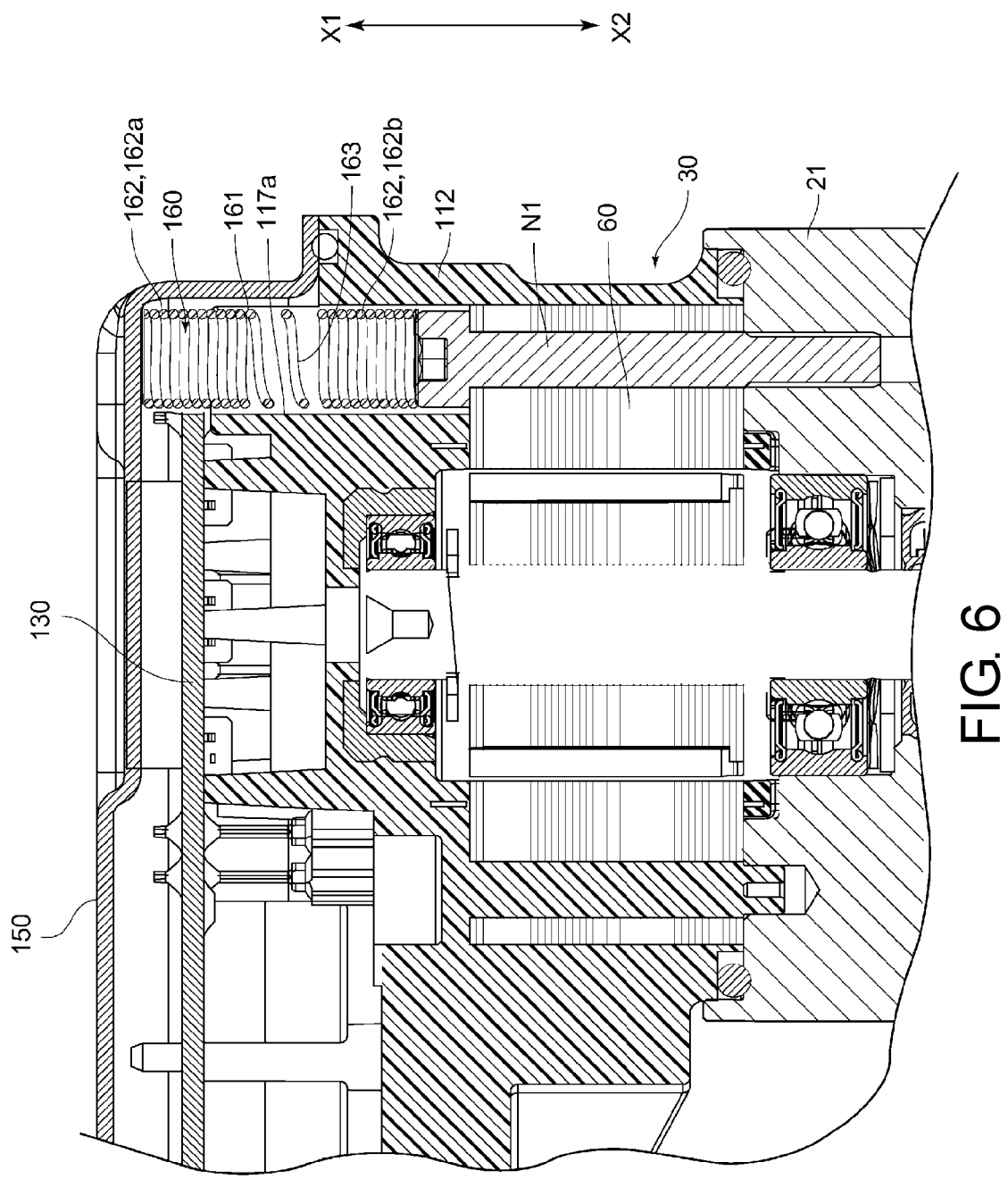
FIG. 6 is a partial lateral sectional view of the pump device illustrated in FIG. 1 and is a diagram illustrating a state in which the coil spring illustrated in FIG. 5 is disposed inside a tubular hole.

FIG. 5 is a perspective view illustrating the configuration of the coil spring 160. FIG. 6 is a partial lateral sectional view of the pump device 10 illustrated in FIG. 1 and illustrating a state in which the coil spring 160 illustrated in FIG. 5 is disposed in the tubular hole 117a. As illustrated in FIG. 5, the coil spring 160 includes a pair of closely-positioned winding portions 162 and a spring deformation portion 163. In the configuration illustrated in FIG. 5, the closely-positioned winding portions 162 are disposed at both ends of the spring deformation portion 163.

In the following description, the closely-positioned winding portion 162 located on the X1 side of the spring deformation portion 163 is referred to as a closely-positioned winding portion 162a, and the closely-positioned winding portion 162 located on the X2 side of the spring deformation portion 163 is referred to as a closely-positioned winding portion 162b. When both does not need to be distinguished from each other, the closely-positioned winding portions are referred to as closely-positioned winding portions 162. The closely-positioned winding portions 162 correspond to a conductive bypass portion.

The closely-positioned winding portion 162 is a portion in which the neighboring wires 161 come in close contact with each other. Accordingly, when the coil spring 160 is disposed in the tubular hole 117a in a compressed state as illustrated in FIG. 1, the closely-positioned winding portions 162 are in a state in which a dimensional variation due to compression is small. The closely-positioned winding portions 162 are portions serving as the conductive bypass portion. That is, a current can flow through a contact portion between the neighboring wires 161. Accordingly, the closely-positioned winding portion 162 is in a state equivalent to a state in which it has a single tubular portion formed of a metal, and this state is a state in which a current flows in the single tubular portion formed of a metal. In this case, since it can be considered that a current flows in a single wire 161 in the X direction, only a magnetic field corresponding to the single wire 161 is generated.

The closely-positioned winding portion 162 can be considered as a tubular portion formed of a metal. When magnetic field lines pass to cross the tubular portion formed of a metal, an eddy current that generates magnetic field lines in a direction in which the magnetic field lines are cancelled out is generated. Accordingly, the closely-positioned winding portions 162 also serve as portions for cancelling magnetic field lines.

On the other hand, the spring deformation portion 163 is a portion in which the neighboring wires 161 are separated from each other with a sufficient gap therebetween, and the number of windings per unit length is significantly smaller than those of the closely-positioned winding portions 162. Accordingly, in the spring deformation portion 163, a dimensional variation due to compression increases before and after a biasing force is applied when the cover body 150 is attached.

In an air-core portion surrounded with the spring deformation portion 163, a magnetic flux density with a magnitude proportional to the number of windings is generated. However, in the configuration illustrated in FIG. 5, the closely-positioned winding portions 162 are disposed at both ends of the spring deformation portion 163. Accordingly, most of the magnetic field lines passing through the air-core portion of the spring deformation portion 163 comes in and out the outside of the air-core portion via the gaps between the wires 161 at both ends of the spring deformation portion 163.

Here, when the coil spring 160 is disposed in the tubular hole 117a as illustrated in FIG. 1, the closely-positioned winding portion 162 extends over the front and back sides of the circuit board 130. For example, when the surface on the X1 side of the circuit board 130 in FIG. 1 is defined as the front side and the opposite surface thereof is defined as the back side, the closely-positioned winding portion 162a extends over both the front side and the back side of the circuit board 130. On the other hand, the spring deformation portion 163 is located only on the back side of the circuit board 130. Accordingly, when a current flows in the wire 161, most magnetic field lines do not penetrate the circuit board 130 and draw a loop which comes in and out between the wires 161 of the spring deformation portion 163.

The coil spring 160 constitutes the static electricity removing path for static electricity. Here, the static electricity removing path in this embodiment is a path for discharging static electricity generated on the pump unit 20 or the motor unit 30 side to the outside. Specifically, the static electricity removing path includes the tightening bolt N1, the coil spring 160, the cover body 150, the conductive elastic member 131, the conductive pattern on the circuit board 130, and the connector terminal 123. By electrically connecting the connector terminal 123 to the external connection terminal which is grounded, static electricity generated on the pump unit 20 or the motor unit 30 side can be discharged to the outside.

3. Advantageous Effects

According to the pump device 10 having the above-mentioned configuration, the circuit board 130 faces the cover body 150 and the motor unit 30 in an electrical noncontact manner. The coil spring 160 is disposed in a circumferential edge of the circuit board 130 to extend over the front and back sides of the circuit board 130, and comes into contact with the cover body 150 and the motor unit 30 in an electrical connected state. The motor unit 30, the coil spring 160, and the cover body 150 constitute the static electricity removing path for discharging static electricity to the outside. The coil spring 160 includes the spring deformation portion 163 that enables spring deformation such that the neighboring wires 161 move toward or away from each other by winding the neighboring wires 161 in a noncontact state and the closely-positioned winding portion 162 that is continuously disposed to extend from at least one end of the spring deformation portion 163 and serves as a conductive bypass portion extending over the front and back sides of the circuit board 130.

Accordingly, even when a current flows in the wire 161 due to static electricity on the pump unit 20 or the motor unit 30 side and magnetic field lines are generated in the spring deformation portion 163, it is possible to much reduce the magnetic field lines penetrating the circuit board 130. That is, it is possible to much reduce an influence of a magnetic field on the circuit board 130.

Figure 7:
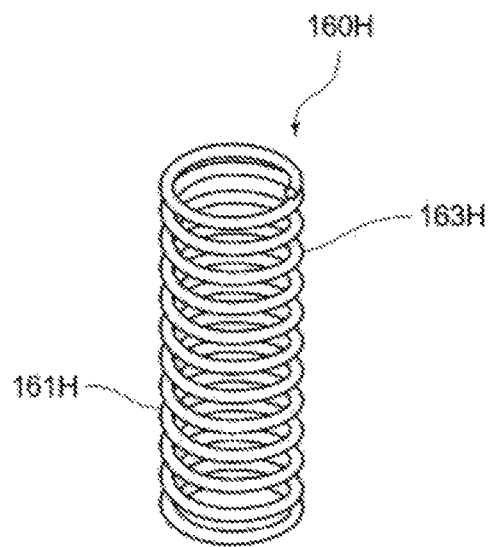
FIG. 7 is a perspective view illustrating a configuration of a coil spring having a conventional configuration.
Figure 8:
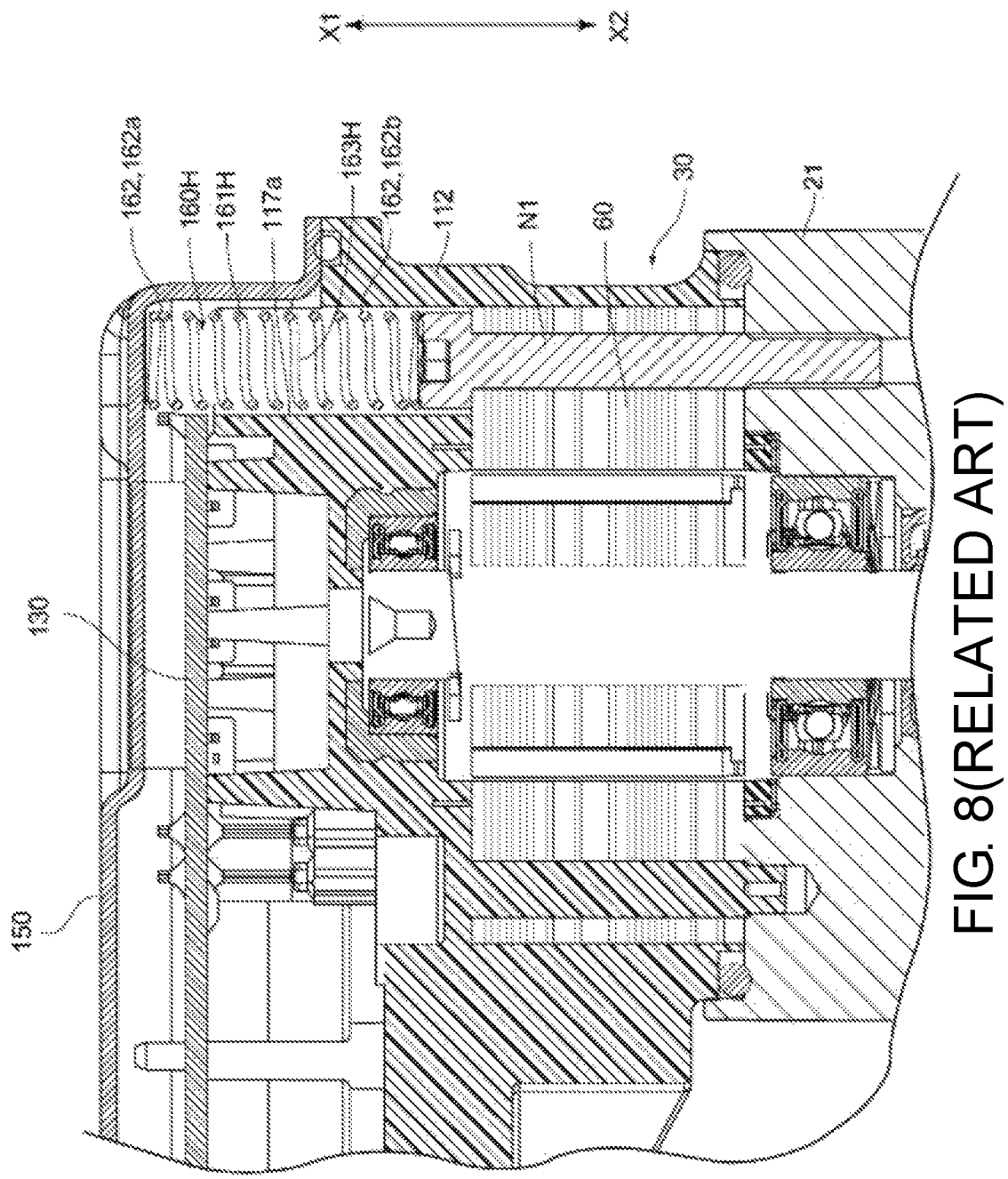
FIG. 8 is a partial lateral sectional view of a pump device having a conventional configuration and is a diagram illustrating a state in which the coil spring illustrated in FIG. 7 is disposed inside a tubular hole.

A coil spring 160H having a conventional configuration is illustrated in FIG. 7. FIG. 7 is a perspective view illustrating the configuration of the coil spring 160H having the conventional configuration. A state in which the coil spring 160H having the conventional configuration is attached to a pump device is illustrated in FIG. 8. FIG. 8 is a partial lateral sectional view of a pump device having a conventional configuration and is a diagram illustrating a state in which the coil spring 160H illustrated in FIG. 7 is disposed inside a tubular hole 117a.

In the configuration illustrated in FIG. 7, unlike the coil spring 160 illustrated in FIG. 5, neighboring wires 161H come in contact with each other in only portions serving as bearing surfaces of ends. Accordingly, a portion corresponding to the closely-positioned winding portion 162 with a predetermined length illustrated in FIG. 5 is not provided. Accordingly, since a spring deformation portion 163H is disposed to extend over the front side and the back side of the circuit board 130 as illustrated in FIG. 8, magnetic field lines penetrate the circuit board 130. Accordingly, there is concern that a noise current will be generated in a circuit pattern of the circuit board 130 near a portion penetrated by magnetic field lines.

On the other hand, in the coil spring 160 according to this embodiment, since the closely-positioned winding portion 162 serving as the conductive bypass portion is disposed to extend over the front side and the back side of the circuit board 130 as illustrated in FIG. 5, the spring deformation portion 163 does not extend over both the front side and the back side of the circuit board 130 but is disposed on only any one side thereof. Accordingly, in comparison with the arrangement of the conventional configuration illustrated in FIG. 8, since most of the magnetic field lines generated in the spring deformation portion 163 do not penetrate the circuit board 130, it is possible to curb generation of a noise current in the circuit board 130 in this embodiment.

In this embodiment, the conductive bypass portion includes the closely-positioned winding portion 162 in which the neighboring wires 161 come in close contact with each other. In the closely-positioned winding portion 162, a current flows between the neighboring wires 161 in a short-circuiting manner. In this way, since the neighboring wires 161 in the closely-positioned winding portion 162 come into close contact with each other and causes a short circuit, the closely-positioned winding portion 162 is equivalent to a tubular conductor portion. Accordingly, since the closely-positioned winding portion 162 is in a state equivalent to a state in which a current flows in a single conductor portion made of a metal which can be considered to be equivalent to flowing of a current in one wire 161 extending in the X direction, it is possible to obtain a state in which only the magnetic field corresponding to the single wire 161 is generated. When magnetic field lines cross the closely-positioned winding portion 162 which is a tubular conductor portion, an eddy current generating magnetic field lines in a direction in which the magnetic field lines are cancelled is generated and thus the closely-positioned winding portion 162 can serve as a portion for cancelling magnetic field lines. Accordingly, it is possible to further reduce magnetic field lines penetrating the circuit board 130 and thus to further curb generation of a noise current in the circuit pattern of the circuit board 130.

In this embodiment, the closely-positioned winding portion 162 is disposed at both ends of the spring deformation portion 163. Accordingly, since there is no directivity when the coil spring 160 is disposed in the tubular hole 117a, the direction of the coil spring 160 may be reversed for attachment. Accordingly, it is possible to reduce control items in the process of assembling the coil spring 160 or check items after completion.

In this embodiment, the pump device 10 includes the motor unit 30 as a drive unit, and the pump unit 20 is attached to the motor unit 30. The pump unit 20 includes the rotor portion (the outer rotor 22 and the inner rotor 23) that is rotatable and that is rotated by the rotation shaft 31. Accordingly, the pump device 10 according to this embodiment can curb generation of a noise current in the circuit pattern of the circuit board 130 even when static electricity is generated on the pump unit 20 or the motor unit 30 side at the time of operation. Accordingly, in the pump device 10 according to this embodiment, it is possible to realize control with desired high accuracy.

4. Modified Examples

While an embodiment of the disclosure has been described above, the disclosure can be further modified in various forms. The modifications will be described below.

In the above-mentioned embodiment, the pump device 10 including the motor unit 30 as a drive device has been described. However, the drive device is not limited to such a configuration. For example, drive devices including various drive units such as a solenoid, a power cylinder, and a linear actuator can be used as the drive device. That is, any configuration may be employed as long as a circuit board 130A is disposed between a drive unit 30A and a cover body 150A and a coil spring 160A electrically connects the drive unit 30A and the cover body 150A as illustrated in FIG. 9.

Figure 9:
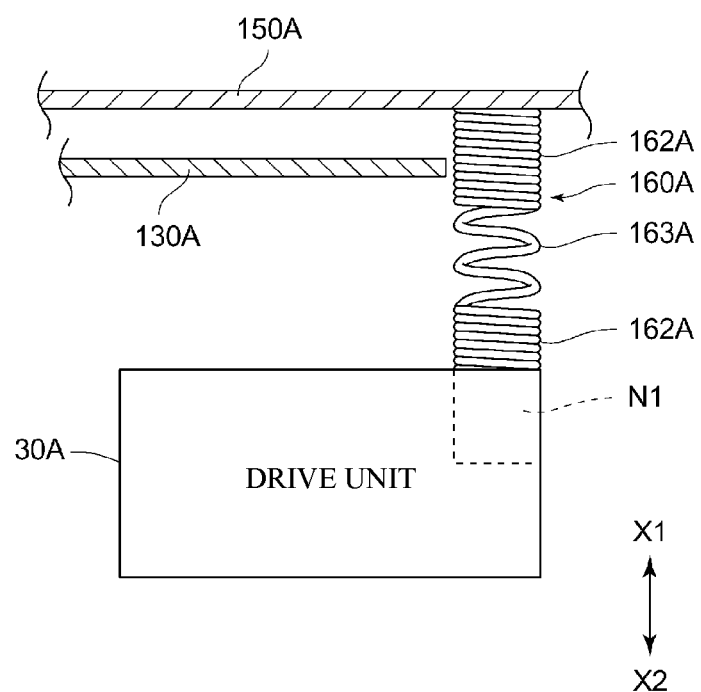
FIG. 9 is a diagram schematically illustrating a configuration of a drive device according to the disclosure.

In the configuration illustrated in FIG. 9, a closely-positioned winding portion 162A serving as a conductive bypass portion is disposed to extend over the front side and the back side of the circuit board 130A. The spring deformation portion 163A does not extend over both the front side and the back side of the circuit board 130A, but is disposed on only any one side. Accordingly, since most magnetic field lines generated in the spring deformation portion 163A do not penetrate the circuit board 130, it is possible to curb generation of a noise current in the circuit board 130A.

In the above-mentioned embodiment, the closely-positioned winding portion 162 is disposed at both ends of the spring deformation portion 163 as illustrated in FIG. 1. However, the closely-positioned winding portion 162 may be configured to be disposed at any one end of the spring deformation portion 163. A portion replacing the closely-positioned winding portion 162 may be provided in the coil spring 160 serving as a spring member. For example, a linear portion having a straight line shape (this linear portion corresponds to the conductive bypass portion) extending in the axial direction (the X direction) of the coil spring 160 from the spring deformation portion 163 may be provided, and the linear portion may be disposed to extend over the front side and the back side of the circuit board 130. A torsion spring other than the coil spring may be used as the spring member. In this case, the spring member may be disposed such that an axial direction of a winding portion of the torsion spring (this winding portion corresponds to the spring deformation portion) is not parallel to but crosses the axial direction of the tubular hole 117a.

In the above-mentioned embodiment, the coil spring 160 is disposed in a circumferential edge portion of the circuit board 130. However, a configuration in which a penetration hole is formed in the circuit board 130 and the coil spring 160 is disposed to be inserted into the penetration hole can be employed in the disclosure.

In the above-mentioned embodiment, the trochoid pump has been described as the pump unit 20 of the pump device 10. Accordingly, the pump body 21 includes the recessed portion 211 in which the outer rotor 22 and the inner rotor 23 corresponding to the pump rotor are accommodated. However, a configuration in which the pump body does not include a recessed portion may be employed. For example, when the pump device is a volute pump, a configuration in which an impeller is disposed in a flat portion may be employed. In this case, a casing may be provided to cover the flat portion.

The pump unit 20 may employ various types of pump units such as an oil pump, a water pump, and an air pump.

REFERENCE SIGNS LIST

10: Pump device
20: Pump unit
21: Pump body
22: Outer rotor
23: Inner rotor
24: Pump cover
30: Motor unit (corresponding to drive unit)
30A: Drive unit
31: Rotation shaft
40: Rotor
41: Yoke
42: Magnet
50: Stator 51: Center hole
60: Stator core
61: Penetration hole
70: Coil-wound body
80: Bobbin
81: Connection terminal
90: Coil
100: Resin-molded portion
110: Stator molded portion
111: Bottom-side molded portion
111a: Recessed fitting portion
112: Outer circumferential molded portion
113: Insulating cover portion
115: Positioning pin
116: Insertion hole
117: Guide wall portion
117a: Tubular hole
120: Board attaching portion
121: Boss
123: Connector terminal
124: Connector cover
130, 130A: Circuit board
131: Conductive elastic member
140: Stator module
150, 150A: Cover body
151: Bottom wall surface
160, 160A: Coil spring (corresponding to spring member)
160H: Coil spring
161: Wire
162, 162a, 162b, 162A: Closely-positioned winding portion (corresponding to conductive bypass portion)
163, 163A: Spring deformation portion
210: Contact face
210a, 210a1, 210a2: Hole portion
211: Recessed portion
212: Penetration hole
213: Fitting portion
215: Outer circumferential flange portion
221: Inner circumferential recessed portion
222: Internal gear
231: External gear
600: Electromagnetic steel sheet
B1, B2: Bearing
N1: Tightening bolt
S1: Seal member

What is claimed is:

1. A drive device comprising:
a drive unit that generates a driving force and at least a part of which is formed of a conductive member;
a cover body at least a part of which is formed of a conductive member;
a circuit board that controls driving of the drive unit is disposed between the cover body and the drive unit, and faces the cover body and the drive unit in an electrical noncontact state; and
a spring member that is disposed over front and back sides of the circuit board on a circumferential edge portion of the circuit board or is disposed over the front and back sides of the circuit board by penetrating through a penetration hole in the circuit board, and comes in contact with the cover body and the drive unit in an electrically connectable state,
wherein the drive unit, the spring member, and the cover body constitute a static electricity removing path that discharges static electricity to an outside, and
wherein the spring member includes a spring deformation portion that enables spring deformation such that neighboring wires of the spring member move toward or away from each other by winding the neighboring wires in a noncontact state and a conductive bypass portion that is formed continuously from at least one end of the spring deformation portion and extends over the front and back sides of the circuit board.

2. The drive device according to claim 1, wherein the conductive bypass portion includes a closely-positioned winding portion in which neighboring wires are brought into close contact with each other, and
wherein a current flows between the neighboring wires in the closely-positioned winding portion in a short-circuiting manner.

3. The drive device according to claim 2, wherein the closely-positioned winding portion is disposed at both ends of the spring deformation portion.

4. A pump device comprising:
a drive unit that generates a driving force and at least a part of which is formed of a conductive member;
a cover body at least a part of which is formed of a conductive member;
a circuit board that controls driving of the drive unit is disposed between the cover body and the drive unit, and faces the cover body and the drive unit in an electrical noncontact state; and
a spring member that is disposed over front and back sides of the circuit board on a circumferential edge portion of the circuit board or is disposed over the front and back sides of the circuit board by penetrating through a penetration hole in the circuit board, and comes in contact with the cover body and the drive unit in an electrically connectable state,
wherein the drive unit, the spring member, and the cover body constitute a static electricity removing path that discharges static electricity to an outside,
wherein the spring member includes a spring deformation portion that enables spring deformation such that neighboring wires of the spring member move toward or away from each other by winding the neighboring wires in a noncontact state and a conductive bypass portion that is formed continuously from at least one end of the spring deformation portion and extends over the front and back sides of the circuit board,
wherein the drive unit is a motor unit that applies a driving force for rotating a rotation shaft,
wherein a pump unit is attached to the motor unit, and
wherein the pump unit includes a rotor portion that is rotatable and is rotated by the rotation shaft.

* * * * *